(12) United States Patent
Wickboldt

(10) Patent No.: US 11,676,417 B2
(45) Date of Patent: Jun. 13, 2023

(54) METHOD OF DETECTING SPOOF FINGERPRINTS USING AN OPTICAL FINGERPRINT SENSOR AND POLARIZATION

(71) Applicant: OmniVision Technologies, Inc., Santa Clara, CA (US)

(72) Inventor: Paul Wickboldt, Walnut Creek, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/975,021

(22) Filed: Oct. 27, 2022

(65) Prior Publication Data
US 2023/0071334 A1  Mar. 9, 2023

Related U.S. Application Data

(62) Division of application No. 17/469,508, filed on Sep. 8, 2021, now Pat. No. 11,488,414.

(51) Int. Cl.
G06V 40/12 (2022.01)
G06V 40/13 (2022.01)

(52) U.S. Cl.
CPC ...... G06V 40/1394 (2022.01); G06V 40/1318 (2022.01)

(58) Field of Classification Search
CPC ........... G06V 40/1318; G06V 40/1394; G06V 40/1324; G06V 40/40; G06V 40/45
See application file for complete search history.

(56) References Cited

U.S. PATENT DOCUMENTS

| 10,102,411 B2 | 10/2018 | Lillie et al. |
| 10,438,046 B2 | 10/2019 | He et al. |
| 2006/0202028 A1 | 9/2006 | Rowe et al. |
| 2008/0192988 A1 | 8/2008 | Uludag et al. |
| 2015/0078636 A1 | 3/2015 | Carver et al. |
| 2017/0161540 A1 | 6/2017 | Mienko et al. |

OTHER PUBLICATIONS

U.S. Appl. No. 17/469,461, filed Sep. 8, 2021, Paul Wickboldt.
U.S. Appl. No. 17/469,473, filed Sep. 8, 2021, Paul Wickboldt.
U.S. Appl. No. 17/469,565, filed Sep. 8, 2021, Paul Wickboldt.
U.S. Appl. No. 17/469,508, filed Sep. 8, 2021, Paul Wickboldt.

*Primary Examiner* — Abhishek Sarma
(74) *Attorney, Agent, or Firm* — Cozen O'Connor

(57) ABSTRACT

A method for detecting spoof fingerprints detected using an optical fingerprint sensor and polarization includes controlling a display of an electronic device to output a pattern of light to illuminate a fingerprint sample touching the display; blocking smaller-angle light from impinging a plurality of anti-spoof photodiodes of the pixel array; filtering larger-angle light incident on the plurality of anti-spoof photodiodes to at least one polarization direction; detecting the larger-angle light using the plurality of anti-spoof photodiodes; correlating the larger-angle light with the pattern of light; determining the fingerprint spoofing based at least in part on the correlation of the larger-angle light and the pattern of light; and wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

9 Claims, 12 Drawing Sheets

METHOD OF DETECTING SPOOF FINGERPRINTS USING AN OPTICAL FINGERPRINT SENSOR AND POLARIZATION

CROSS-REFERENCE TO RELATED APPLICATIONS

This application is a divisional application of U.S. application Ser. No. 17/469,508 filed Sep. 8, 2021, and titled "Optical Fingerprint Sensor with Spoof Detection Using Polarization and Associated Method," the entirety of which is incorporated herein by reference.

BACKGROUND

Fingerprint sensing is becoming an increasingly common tool for authorizing (a) access to electronic devices, such as smartphones, (b) access to confidential electronic records, and (c) electronic transactions such as financial transactions carried out over the Internet. Fingerprint sensing satisfies market demand for an authentication mechanism that eliminates the need to enter (and remember) a passcode, and also eliminates the need to keep track of multiple different passcodes associated with different devices and/or accounts. Fingerprint sensing is a well-established form a biometric identification and optical fingerprint sensors have been used for years, e.g., by law enforcement agencies.

Several different types of fingerprint sensors have been designed for use in smartphones and other mobile devices. Each of these types of fingerprint sensors images a finger to obtain the fingerprint. A camera-based fingerprint scanner captures an image of a fingerprint using an imaging lens and an image sensor. A collimator-based fingerprint scanner senses a fingerprint with a lens array aligned over an image sensor with the addition of a collimator above the image sensor. The collimator helps map light from a specific region of the fingerprint sample to be detected by a corresponding region of the image sensor by forming channels the light must propagate through to reach the image sensor.

One issue with fingerprint image sensing is the possibility of generating fake, or spoof, fingerprints that trick the fingerprint sensor in order to gain access to a device. Spoof fingerprints can be fabricated in a range of ways including printing an image of the fingerprint on paper and forming molded objects that reproduce the desired fingerprint pattern. If created with sufficiently high resolution and fidelity to the real fingerprint, these spoofing methods can trick fingerprint sensors and allow unauthorized access to devices and accounts. Fingerprint sensors based on image sensors struggle to distinguish real fingerprints from spoof fingerprints, thereby making fingerprint sensors a less reliable authentication method.

An optical fingerprint sensor with spoof detection using polarization includes a plurality of lenses $L_{m=0}, L_1, \ldots L_{J-1}$ with a lens pitch along a horizontal direction that is orthogonal to a lens axis of lens $L_0$, each lens having a width; an image sensor including a pixel array that includes a plurality of first photodiodes $I_{m=0}, I_1, \ldots I_{J-1}$ with a first photodiode pitch that is equal to the lens pitch in the horizontal direction, a line between a center of a light-sensitive surface of each first photodiode $I_m$ and an optical center of each lens $L_m$ forms an optical axis $O_m$ of a plurality of optical axes $O_{m=0}, O_1, \ldots O_{J-1}$; at least one apertured baffle-layer positioned between the image sensor and the plurality of lenses, each of the at least one apertured baffle-layer being located at a respective height $z_k$ above the pixel array and each having a respective plurality of aperture stops $A_{m=0}, A_1, \ldots A_{J-1}$, each aperture stop $A_m$ being center-aligned with the optical axis $O_m$; a plurality of second photodiodes $S_{m=0}, S_1, \ldots S_{K-1}$ that is included in the pixel array, the plurality of second photodiodes is intercalated with the plurality of first photodiodes such that a second photodiode $S_m$ is between first photodiode $I_m$ and first photodiode $I_{m+1}$ in the horizontal direction, wherein each second photodiode is configured to detect electromagnetic energy having passed through lens $L_m$ and at least one aperture stop $A_{x \neq m}$ not aligned with $L_m$ along optical axis $O_m$; and at least one polarizing element positioned to only polarize electromagnetic energy impinging the plurality of second photodiodes.

A method for detecting spoof fingerprints detected using an optical fingerprint sensor and polarization includes controlling a display of an electronic device to output a pattern of light to illuminate a fingerprint sample touching the display near an optical fingerprint sensor including a pixel array and positioned beneath the display; blocking smaller-angle light from impinging a plurality of anti-spoof photodiodes of the pixel array, the smaller-angle light being electromagnetic energy with incident angle less than five degrees from an optical axis of each anti-spoof photodiode of the plurality of anti-spoof photodiode; filtering larger-angle light incident on the plurality of anti-spoof photodiodes to at least one polarization direction, the larger-angle light being electromagnetic energy with incident angle greater than five degrees from the optical axis; detecting the larger-angle light at the at least one polarization direction using the plurality of anti-spoof photodiodes; correlating the larger-angle light at the at least one polarization direction with the pattern of light; determining the fingerprint spoofing based at least in part on the correlation of the larger-angle light at the at least one polarization direction and the pattern of light; and wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

In an embodiment, a method for detecting spoof fingerprints detected using an optical fingerprint sensor and polarization includes controlling a display of an electronic device to output a pattern of light to illuminate a fingerprint sample touching the display near an optical fingerprint sensor including a pixel array and positioned beneath the display; blocking smaller-angle light from impinging a plurality of anti-spoof photodiodes of the pixel array, the smaller-angle light being electromagnetic energy with incident angle less than five degrees from an optical axis of each anti-spoof photodiode of the plurality of anti-spoof photodiode; filtering larger-angle light incident on the plurality of anti-spoof photodiodes to at least one polarization direction, the larger-angle light being electromagnetic energy with incident angle greater than five degrees from the optical axis; detecting the larger-angle light at the at least one polarization direction using the plurality of anti-spoof photodiodes; correlating the larger-angle light at the at least one polarization direction with the pattern of light; determining the fingerprint spoofing based at least in part on the correlation of the larger-angle light at the at least one polarization direction and the pattern of light; and wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

SUMMARY

Collimator-based fingerprint sensors narrow the acceptable paths that electromagnetic energy may travel between the fingerprint sample and the image sensor. In some instances, they do so by forming channels or cones that transmit electromagnetic energy but block incoming electromagnetic energy with angles and positions not within this intended path. This allows electromagnetic energy from a specific region of the fingerprint sample to reach only the region of the image sensor intended to image that region of the fingerprint and reduces electromagnetic energy from any other region of the fingerprint sample from reaching that region of the image sensor. This can be accomplished in several ways including an array of apertured baffle-layers positioned between a lens array and the image sensor. Each apertured baffle-layer has apertures aligned above each pixel of the image sensor, with the width of each aperture configured to transmit only a narrow cone of acceptable angles of incoming electromagnetic energy. This design has been used to help improve image quality and performance of under-screen fingerprint sensors. The term "light" and the term "electromagnetic energy" are used interchangeable herewithin. Electromagnetic energy herein refers to electromagnetic energy with wavelength between 0.4 and 2 microns.

Techniques exist to overcome fingerprint sensors and gain unauthorized access to devices and information including creating spoof fingerprints. Spoof fingerprints include printed images of fingerprints and molded objects that reproduce the three-dimensional structure of the target fingerprint sample. Current techniques to detect spoof fingerprints largely rely on reviewing real and spoof fingerprints and using algorithms to detect the differences in the images generated of each by the fingerprint sensor. As spoof fingerprints are made with higher resolution and fidelity, the images they produce on the fingerprint sensor become challenging to distinguish from real fingerprint samples. Using only the image generated limits spoof detection and leaves fingerprint sensors vulnerable to high-quality, high-resolution spoof fingerprint attacks.

When printed or molded spoof fingerprint samples are used on fingerprint sensors, the material properties of the sample play a role in how electromagnetic energy interacts between the sample and the fingerprint sensor. This can be exploited to increase spoof detection. Within the glass the fingerprint sensor, electromagnetic energy is scattered from the sample with a range of outgoing angles. This distribution of scattered electromagnetic energy depends on the material being sampled. Human fingers, printed images, and molded objects may produce the same image on the image sensor but they produce different angular distributions of reflected and scattered electromagnetic energy. A fingerprint sensor capable of detecting this angular distribution has superior ability to detect spoofs than one which only records an image of the sample.

Detecting the angular distribution of electromagnetic energy is possible by exploiting the physical design of an apertured baffle-layer collimator that may be used in an optical fingerprint sensor. By design, electromagnetic energy with a small angle of incidence, which is to say with a small angular divergence from the surface normal of the image sensor, is transmitted through the collimator to a pixel of the image sensor corresponding to a physical location on the fingerprint sample from which the electromagnetic energy originated. These pixels of the image sensor are called imaging pixels, herein. Generally, an imaging pixel is aligned with at least one aperture and a given lens along a line roughly parallel to the surface normal of the image sensor. Electromagnetic energy traveling toward the fingerprint sensor with sufficiently large angle of incidence may traverse through a given lens and then through apertures not aligned with that lens, after which it may be incident on image sensor between adjacent imaging pixels. This light is generally not useful for imaging the fingerprint sample and is thus disregarded. In the embodiments described herein, electromagnetic energy with large angle of incidence, so called large-angle light, is detected and used to measure the veracity of a fingerprint sample. By detecting large-angle light, the fingerprint sensor records additional information about the sample that can be used to confirm whether a sample is a real finger or a spoof finger.

When employing algorithms to detect spoof fingerprints, the additional information provided by detecting large-angle light may also be inputted into the algorithms for enhanced spoof-detection accuracy. This is especially valuable with the use of machine learning algorithms, which automatically compare differences between training sets. Variations in angular distributions that are caused by material properties of the sample will be available to machine learning algorithms, which will be able to identify spoof fingerprints based on combination of image details and angular distribution.

In an embodiment, a method for detecting spoof fingerprints detected uses an optical fingerprint sensor positioned beneath a display of an electronic device comprising a pixel array of a plurality of imaging photodiodes and a plurality of anti-spoof photodiodes. The method includes controlling the display to output a pattern of light to illuminate a fingerprint sample touching the display near the optical fingerprint sensor; blocking light from impinging the plurality of anti-spoof photodiodes of the pixel array at smaller angles; blocking light from impinging the plurality of imaging photodiodes at larger angles; polarizing light incident on the plurality of anti-spoof photodiodes to at least one polarization direction; detecting the light at the at least one polarization direction using the plurality of anti-spoof photodiodes; detecting light using the plurality of imaging photodiodes; correlating the light at the at least one polarization direction with one of the pattern of light and the light detected using the plurality of imaging photodiodes; determining the fingerprint spoofing based at least in part on the correlation of the light at the at least one polarization direction and one of the pattern of light and the light detected using the plurality of imaging photodiodes; wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The term semiconductor substrate may refer to substrates formed using semiconductors such as silicon, silicon-germanium, germanium, gallium arsenide, and combinations thereof. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Figure 1A:
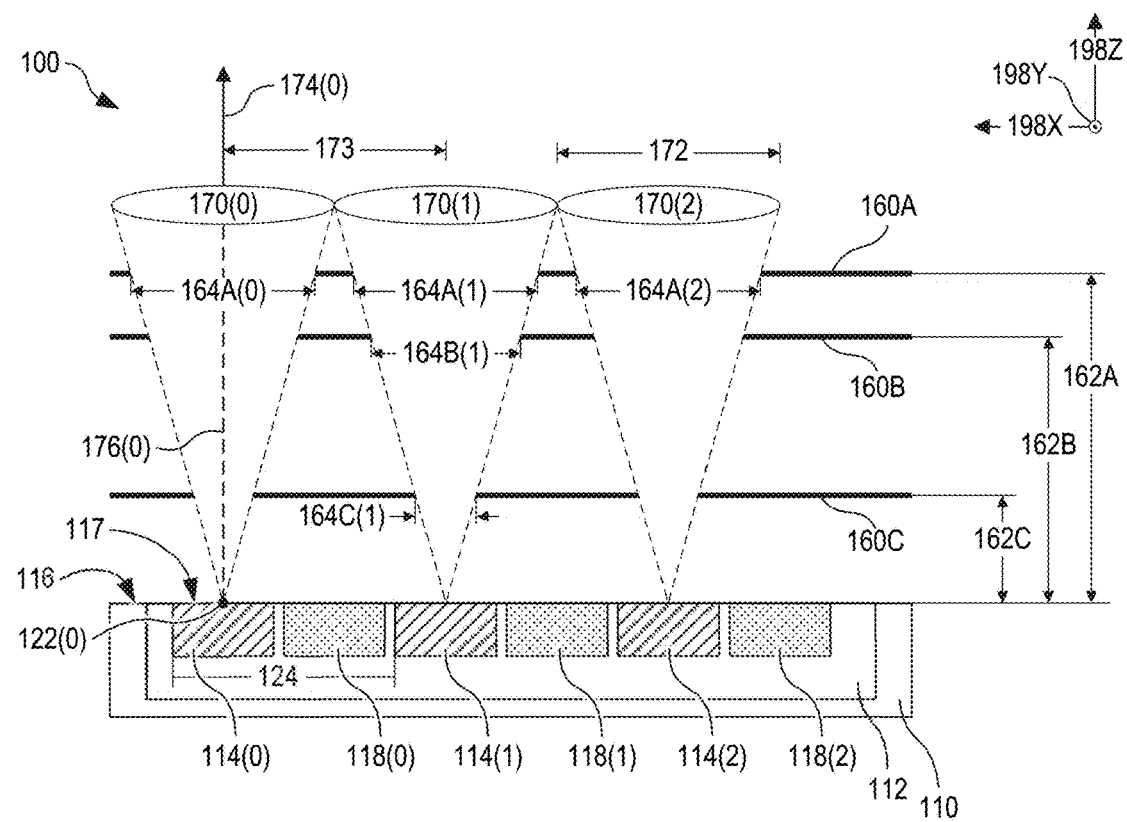
FIGS. 1A and 1B illustrate a cross-sectional side view of an optical fingerprint sensor that detects light with a plurality of second photodiodes to identify spoof fingerprints.
Figure 1B:
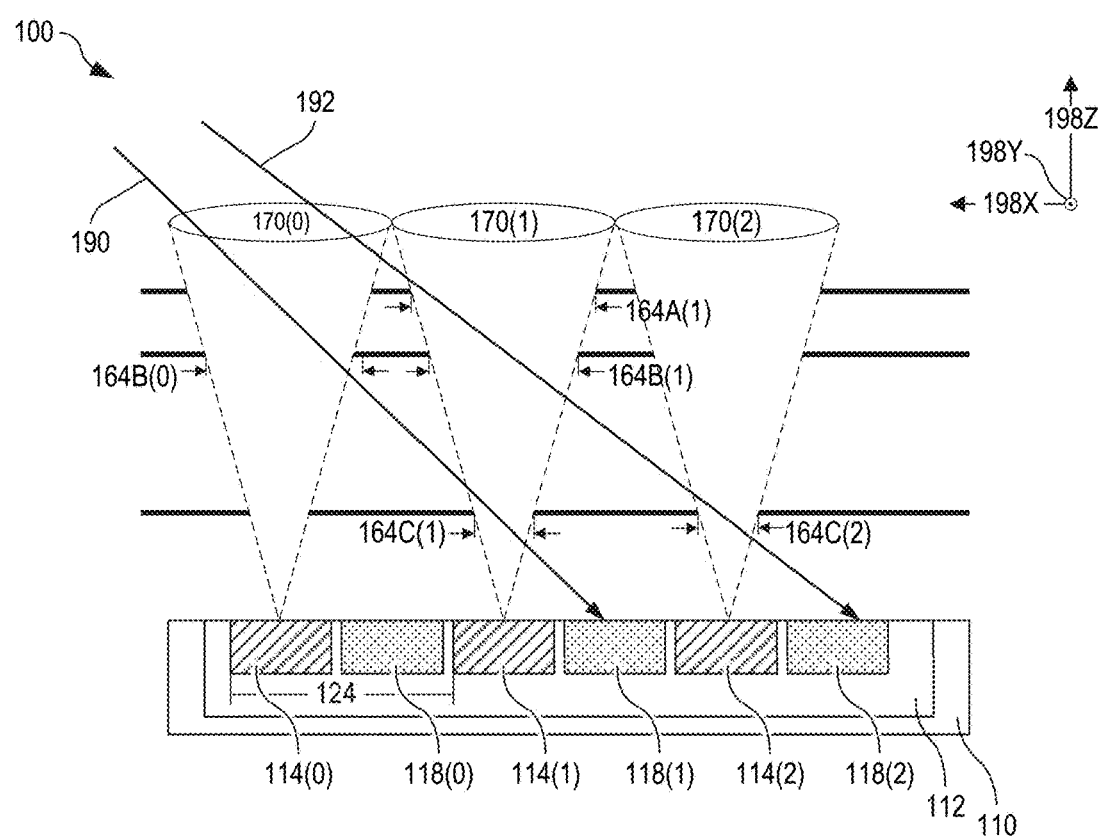

FIGS. 1A and 1B illustrate a cross-sectional side view of an optical fingerprint sensor 100 that detects electromagnetic energy with a plurality of second photodiodes 118 to identify spoof fingerprints. The cross section illustrated in FIGS. 1A and 1B is parallel to a plane, hereinafter the x-z plane, formed by orthogonal axes 198X and 198Z, which are each orthogonal to an axis 198Y. A plane, hereinafter the x-y plane, formed by orthogonal axes 198X and 198Y, and planes parallel to the x-y plane are referred to as horizontal planes. Unless otherwise specified, heights of objects herein refer to the object's extent along axis 198Z. Herein, a reference to an axis x, y, or z refers to axes 198X, 198Y, and 198Z respectively. Also, herein, a width refers to an object's extent along the x axis, a depth refers to an object's extent along the y axis, a thickness (of thinness) refers to an object's extent along the z axis, and vertical refers to a direction along the z axis. Also, herein, above refers to a relative position a distance away along the axis 198Z in the positive direction and below refers to a relative position a distance away along the axis 198Z in the negative direction. FIGS. 1A and 1B are best viewed together.

Optical fingerprint sensor 100 includes a plurality of lenses 170, an image sensor 110, and at least one apertured baffle-layers 160. The plurality of lenses 170 includes J lenses, 170($m$=0), 170(1), 170(2) . . . 170(J–1). Each lens 170 has a lens width 172 and the plurality of lenses 170 has a lens pitch 173 along a horizontal direction. The horizontal direction In FIGS. 1A and 1B the lens width 172 and lens pitch 173 are equal but the lens width 172 may be smaller than the lens pitch 173 without departing from the scope hereof. The lens 170(0) has a lens axis 174 that is parallel to the axis 198Z. The plurality of lenses 170 is positioned above a light-sensitive surface 116 of the image sensor 110. The image sensor 110 includes a pixel array 112 that includes a plurality of first photodiodes 114 that contains J photodiodes, 114($m$=0), 114(1), 114(2) . . . 114(J–1). The plurality of first photodiodes 114 has a first photodiode pitch 124 that, in an embodiment illustrated in FIGS. 1A and 1B, is equal to the lens pitch 173 in the horizontal direction. A line that connects an optical center of each lens 170 and a center 122 of a light-sensitive surface 117 of each first photodiode 114 forms an optical axis 176 of a plurality of optical axes 176. In an embodiment, each optical axis of the plurality of optical axes 176 is normal to the light sensitive surface 116 and each lens 170 has a lens axis 174 aligned with the optical axis 176 of the respective first photodiode 114. In an embodiment, the optical axis 176(m) of each lens 170(m) depends on the horizontal location of the lens 170(m). In a so-called "fan-out" design, a lens 170(m) aligned with photodiode 114(m) near center of the pixel array 112 has optical axis 176(m) that is substantially normal to the light-sensitive surface 116 but lens 170(n) aligned with photodiode 114(n) near the edge of the pixel array 112 has optical axis 176(n) angled with respect to the surface normal of the light sensitive surface 116. In the embodiment illustrated in FIGS. 1A and 1B, the distance between each lens 170 and the corresponding first photodiode 114 is configured along with the focal length of the lens 170 such that collimated electromagnetic energy incident on the lens 170 from the positive z direction and parallel to the optical axis 176 will be focused to the center 122 of first photodiode 114. The plurality of first photodiodes 114 record light that is reflected from a fingerprint sample that is then used to generate a fingerprint image. In an embodiment, each first photodiode 114 is a sub-array of the pixel array 112 including more than one photodiode.

Each apertured baffle-layer 160 is positioned between the plurality of lenses 170 and the image sensor 110. Each of the at least one apertured baffle-layers 160 is located a respective height 162 above the pixel array 112. The embodiment illustrated in FIGS. 1A and 1B includes three apertured baffle-layers, 160A, 160B, and 160C that are a height 162A, 162B, and 162C, respectively, above the pixel array 112. The optical fingerprint sensor 100 may have more or fewer apertured baffle-layers 160 without departing from the scope hereof. The relative spacing and height of each apertured baffle-layer 160 above the pixel array 112 is for illustrative purposes and is not meant to limit the possible configurations of the apertured baffle-layers 160 within the optical fingerprint sensor 100.

Each apertured baffle-layer 160 has a respective plurality of apertures stops 164 that contains J aperture stops, 164A(m=0), 164A(1), 164A(2) 164A(J−1). Each aperture stop 164 is center-aligned with a given first photodiode 114 along the corresponding optical axis 176. For example apertures stops 164A(0), 164A(1), and 164A(2) of apertured baffle-layer 160A are center-aligned with respective optical axes 176(0), 176(1), and 176(2). Some optical axes are not illustrated for clarity of illustration. In the embodiment illustrated in FIGS. 1A and 1B, the aperture stops 164A(1), 164B(1), and 164C(1) are center-aligned with the optical axis 176(1), not shown for clarity of illustration.

The pixel array 112 includes the plurality of second photodiodes 118 that contains k photodiodes, 118(m=0), 118(1), 118(2) . . . 118(k−1). The plurality of second photodiodes 118 is intercalated with the plurality of first photodiodes 114 such that a second photodiode 118(m) is between first photodiode 114(m) and first photodiode 114(m+1) in the horizontal direction. Each second photodiode 118 is configured to detect electromagnetic energy having passed through lens $L_m$ and at least one aperture stop $A_{x \neq m}$ not aligned with $L_m$ along the optical axis $O_m$. This is illustrated in FIG. 1B. A ray of electromagnetic energy 190 passes through lens 170(m=0) and through aperture stop 164C(m=1). Another ray of electromagnetic energy 192 passes through lens 170(m=0) and through aperture stops 164A(m=1), A164B(m=1) and 164C(m=2). Both rays of electromagnetic energy 190 and 192 are detected by a second photodiode (118(1) and 118(2), respectively) of the plurality of second photodiodes 118. In an embodiment, each second photodiode 118 is a sub-array of the pixel array 112 including more than one photodiode Electromagnetic energy detected by the plurality of second photodiodes 118 enters the optical fingerprint sensor 100 with a large angle of incidence with respect to the optical axis 176. This large-angle electromagnetic energy is quantified here as incoming electromagnetic energy incident on lens 170(m) with an angle of incidence divergent from the optical axis 176(m) by greater than five degrees.

In an embodiment, each of the apertured baffle-layers 160 is opaque to visible electromagnetic energy, for example, light incident on the apertured baffle-layer 160 between adjacent apertures stops of the plurality of aperture stops 164. This reduces the number of paths that incoming electromagnetic energy may take and still be incident on the plurality of first photodiodes 114. As discussed earlier, each apertured baffle-layers 160 helps the optical fingerprint sensor 100 record an image of a fingerprint sample.

Figure 2:
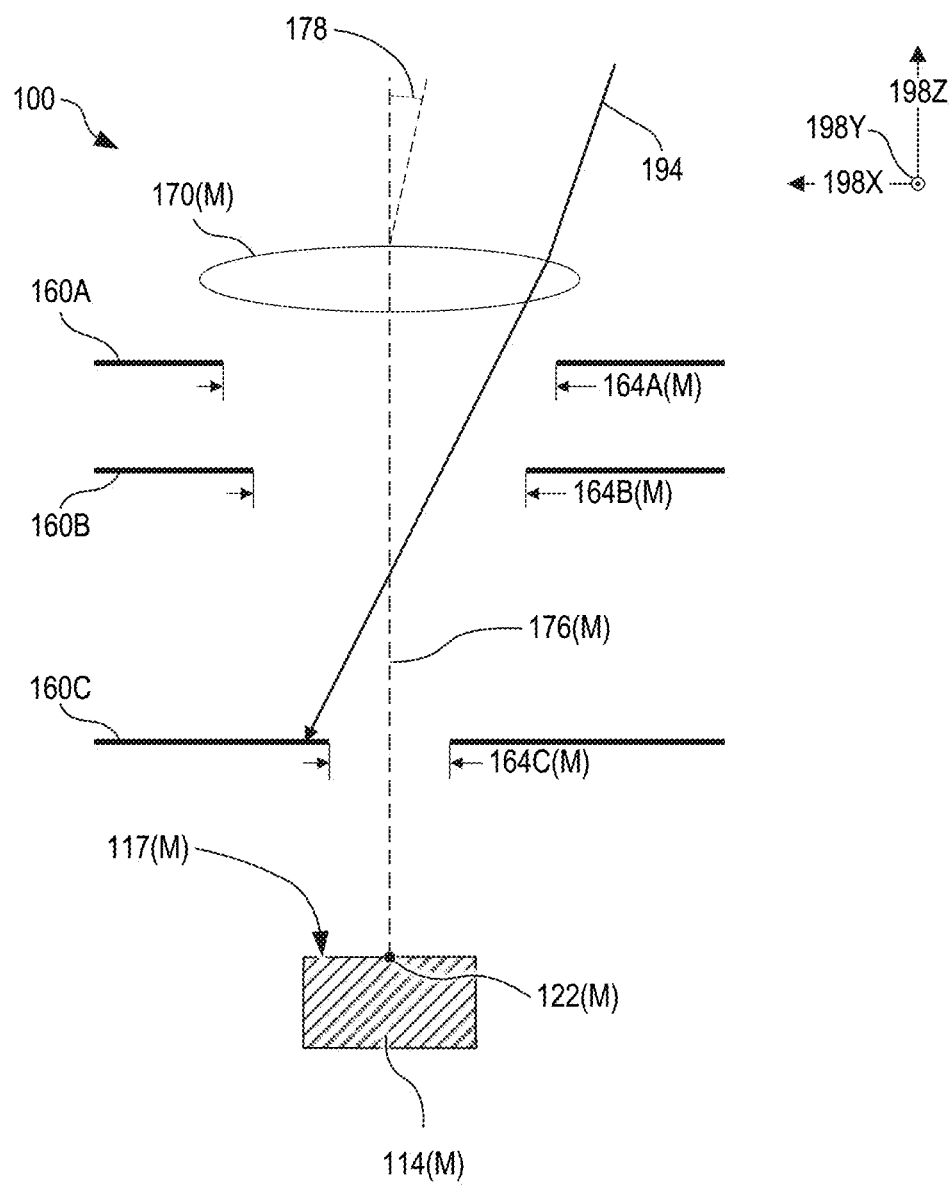
FIG. 2 is a schematic cross-sectional view of part of the optical fingerprint sensor of FIGS. 1A and 1B, according to an embodiment.

FIG. 2 is a schematic cross-sectional view of part of optical fingerprint sensor 100 including the first photodiode 114(m), center 122(m) of the light-sensitive surface 117(m), along with lens 170(m), optical axis 176(m), and sections of the least one apertured baffle-layers 160A, 160B, and 160C that include apertures stops 164A(m), 164B(m), and 164C(m) respectively.

Each of the aperture stops 164A(m), 164B(m), and 164C(m) illustrated in FIG. 2 is center-aligned with the optical axis 176(M). Each aperture stop 164A(m), 164B(m), and 164C(m) has a width such that they collectively transmit electromagnetic energy incident on the lens 170(m) that falls within an acceptance angle 178, which is measured as an angular divergence from the optical axis 176(m) of rays incident on the lens 170(m). A ray of electromagnetic energy 194 with incident angle larger than the acceptance angle 178 is prevented from striking the first photodiode 114(M) when it is incident on the apertured baffle-layer 160C. In an embodiment, each aperture stop of the plurality of aperture stops 164 on each of the at least one apertured baffle-layers is circular in a horizontal plane.

Figure 3:
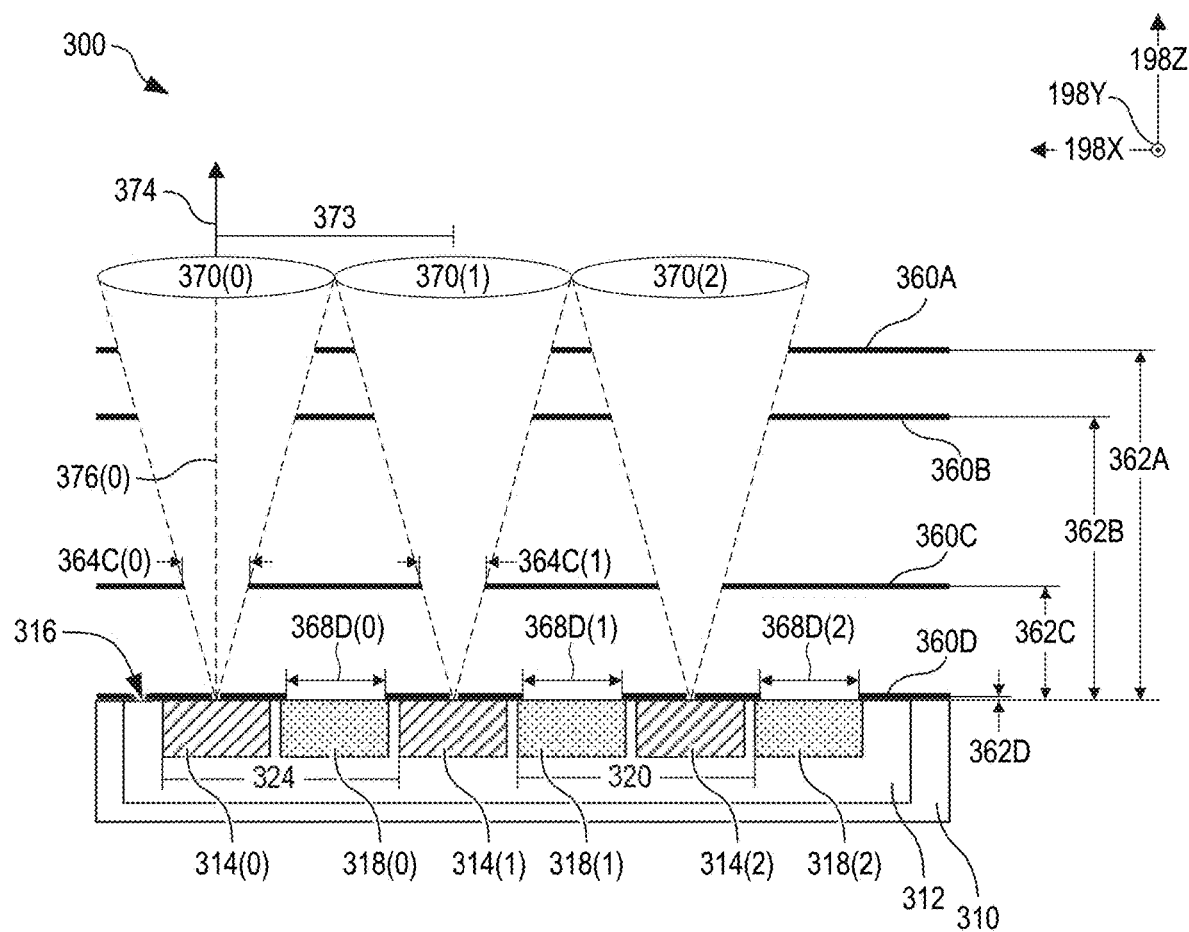
FIG. 3 is a schematic cross-sectional view of the optical fingerprint sensor of FIGS. 1A and 1B with a fourth apertured baffle-layer that is less than ten microns above the light-sensitive surface of the image sensor, according to an embodiment.

FIG. 3 is a schematic cross-sectional view of an optical fingerprint sensor 300 that is an example of the optical fingerprint sensor 100 of FIG. 1. In the embodiment illustrated in FIG. 3, at least one apertured baffle-layer 360 includes a fourth apertured baffle-layer 360D having a distance 362D less than ten microns above a light-sensitive surface 316 of an image sensor 310. The apertured baffle-layer 360D has a plurality of aperture stops 364 with J apertures stops 364D(0), 364D(1) . . . 364D(J−1) (not indicated) like those illustrated in FIGS. 1A, 1B, and 2. Apertured baffle-layer 360D further includes a plurality of second aperture stops 368 with K aperture stops 368D(0), 368D(1) . . . 368D(K−1), there being one second aperture stop 368 for each second photodiode 318 of a plurality of second photodiodes 318. Each second aperture stop 368 is center-aligned with a center of a light-sensitive surface (not indicated) of a respective second photodiode 318 in a direction parallel to an optical axis 376, as illustrated in FIG. 3. The plurality of second aperture stops 368 on apertured baffle-layer 360D permit electromagnetic energy to be detected by the plurality of second photodiodes 318 while further restricting the paths available that allow electromagnetic energy to be detected by a plurality of first photodiodes 314. The distance 362D may be varied depending on the fabrication processes used and the tolerances associated with those processes.

In an embodiment, the number of first photodiodes 314 is equal to the number of second photodiodes 318. Accordingly, the number of lenses 370, the number of apertures stops on each apertured baffle-layer 360, and the number of second aperture stops 368 are also equal, both to each other and to the number of first photodiodes 314 and to the number of second photodiodes 318. More succinctly, the counters above, J and K, are equal. This need not be the case, however. The relative quantity of first photodiodes 314 and second photodiodes 318 may vary without departing from the scope hereof.

FIG. 3 illustrates an embodiment where the plurality of second photodiodes 318 has a second photodiode pitch 320 that is equal to the first photodiode pitch 324 and to the lens pitch 373 in the horizontal direction. The first photodiode pitch 324 and the second photodiode pitch 320 need not be equal, however, and embodiments may have larger or small second photodiode pitch 320 relative to first photodiode pitch 324 without departing from the scope hereof. In an embodiment, each second photodiode 318 is wider than each first photodiode 314 and/or has a larger depth The relative width and depth of each first photodiode 314 to each second photodiode 318 may vary without departing from the scope hereof.

Figure 4:
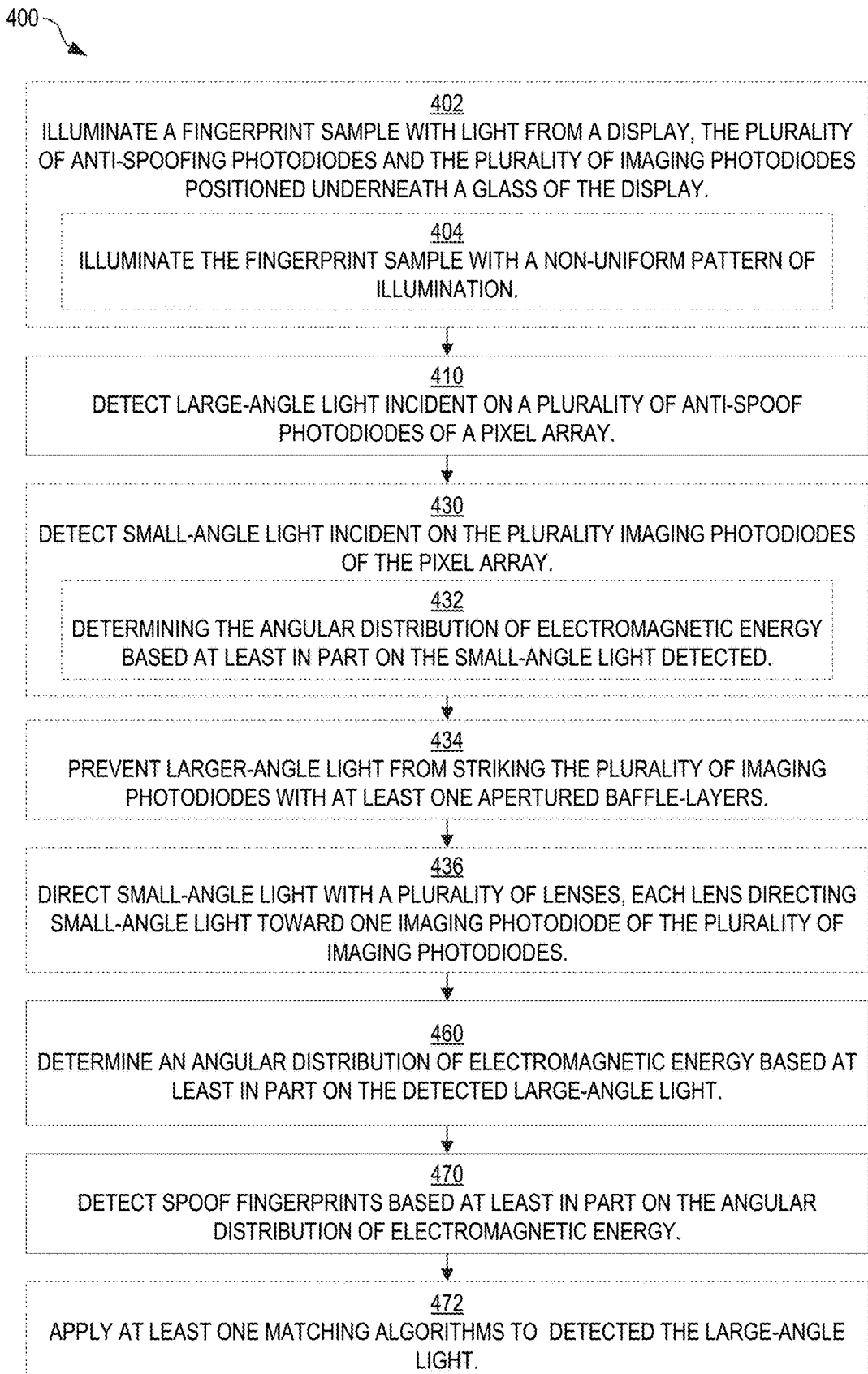
FIG. 4 is a flowchart illustrating a method for detecting spoof fingerprints using a plurality of anti-spoof pixels, the method may be used in conjunction with the optical fingerprint sensor of FIG. 1A, 1B, 2, or 3, in embodiments.

FIG. 4 is a flowchart illustrating a method 400 for detecting spoof fingerprints using a plurality of anti-spoof pixels. Method 400 may be implemented by any one of the optical fingerprint sensors 100 or 300 of FIGS. 1A, 1B, 2, and 3. Method 400 includes blocks 410, 460, and 470. In embodiments, method 400 also includes at least one of blocks 402, 404, 430, 432, 434, 436, and 472.

In block 410, large-angle light incident on a plurality of anti-spoof photodiodes of a pixel array is detected. Large-angle light is incoming electromagnetic energy with incident angle greater than five degrees from the optical axis of the anti-spoof photodiode. The plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes. In an example of block 410, rays of electromagnetic energy 190 and 192 are detected by second photodiodes (118(1) and 118(2), respectively) of the plurality of second photodiodes 118.

In block 460, an angular distribution of electromagnetic energy is determined at least in part on the detected large-angle light. In one example of block 460, an angular distribution of electromagnetic energy is determined, at least in part by rays of electromagnetic energy 190 and 192 that are detected by the plurality of second photodiodes 118.

In block 470, spoof fingerprints are detected based at least in part on the angular distribution of electromagnetic energy.

Figure 5:
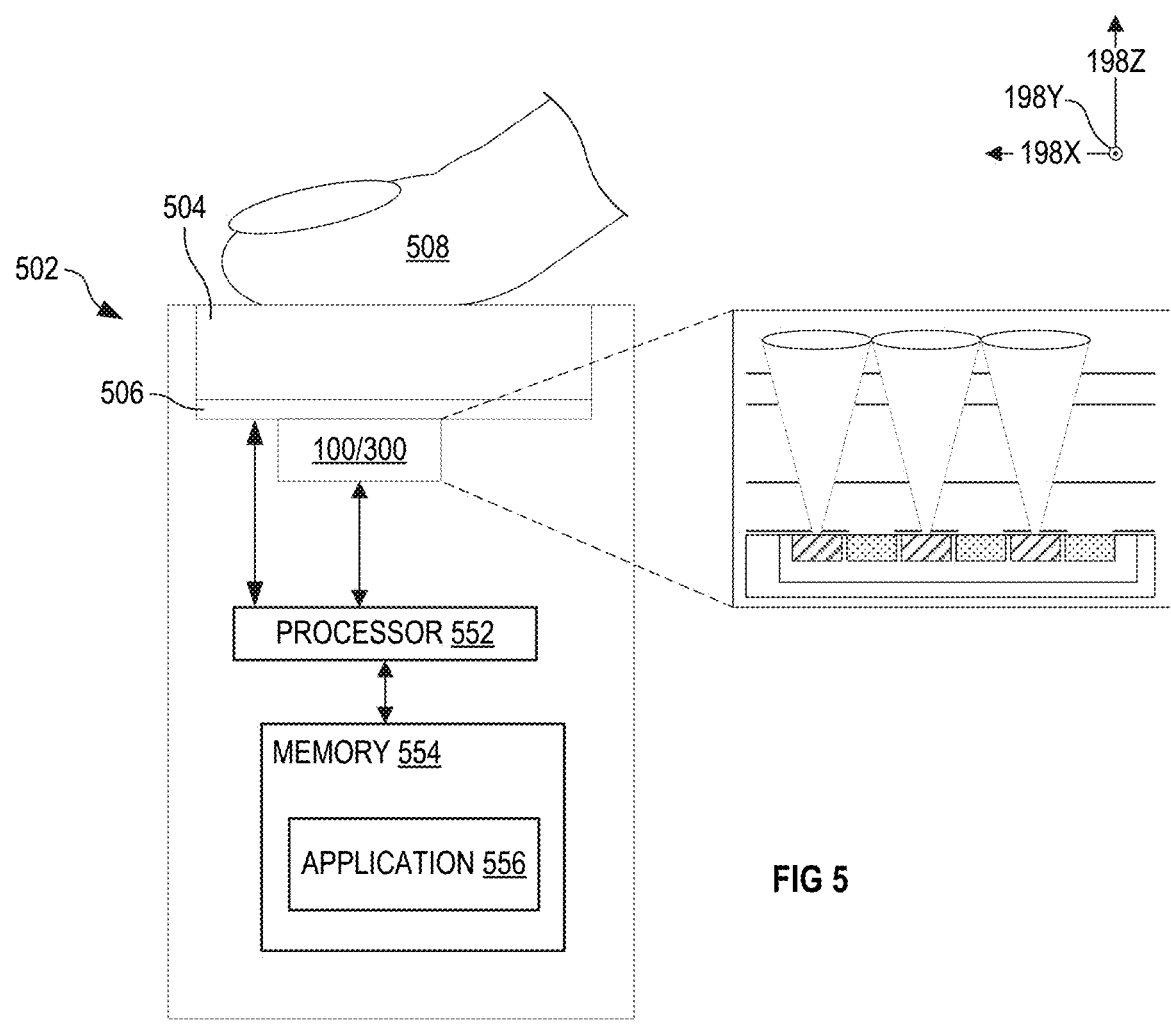
FIG. 5 illustrates a finger being scanned by the optical fingerprint sensor of FIGS. 1A and 1B installed below the screen of a mobile device, according to an embodiment.

In certain embodiments, the method 400 includes one or more additional blocks of the flowchart in FIG. 4. In block 402, a fingerprint sample is illuminated with electromagnetic energy from a display and the plurality of anti-spoofing photodiodes and the plurality of imaging photodiodes are positioned underneath a glass of a display. One example of a device implementing block 402 is illustrated in FIG. 5, described below. In block 404, the fingerprint sample is illuminated with a non-uniform pattern of illumination, which aids in determining the angular distribution of electromagnetic energy in block 460.

In block 430, small-angle light incident on the plurality imaging photodiodes of the pixel array is detected, small-angle light being incoming electromagnetic energy with incident angle less than five degrees from the optical axis of the anti-spoof photodiode. In an example of block 430, electromagnetic energy is transmitted through lens 170(0) and then passes through aperture stops 164A(0), 164B(0), and 164C(0) before being detected by first photodiode 114(0).

Block 430 may include block 432, in which the angular distribution of electromagnetic energy is determined at least in part based on the small-angle light detected. In one example of block 432, an angular distribution of electromagnetic energy is determined at least in part based on (i) electromagnetic energy propagating through lens 170(0) and then passes through aperture stops 164A(0), 164B(0), and 164C(0) before being detected by first photodiode 114(0) and (ii) electromagnetic energy 190 and 192 that is detected by second photodiodes (118(1) and 118(2), respectively) of the plurality of second photodiodes 118 of FIG. 1B.

In block 434, large-angle light is prevented from striking the plurality of imaging photodiodes using at least one apertured baffle-layer. In an example of block 434, the ray of electromagnetic energy 194 is prevented from reaching the first photodiode 114(M) by the apertured baffle-layer 160A, FIG. 2.

In block 436, small-angle light is directed with a plurality of lenses, in which a lens directs small-angle light toward one imaging photodiode of the plurality of imaging photodiodes. In an example of block 436, electromagnetic energy is transmitted through lens 170(0) and then passes through aperture stops 164A(0), 164B(0), and 164C(0) before being detected by first photodiode 114(0), FIG. 1A.

In block 472, at least one matching algorithm is applied to the detected large-angle light. In an embodiment, the at least one matching algorithm includes machine learning algorithms.

FIG. 5 illustrates the optical fingerprint sensor 100 installed in a mobile device 502 below a display including a cover glass 504 and a light-emitting layer 506. A fingerprint sample 508 is being scanned by the optical fingerprint sensor 100, which is shown in more detail in an inset to the right. In an embodiment, the mobile device 502 may be a mobile phone, tablet, or other electronic device with a display. In an embodiment, the light-emitting layer 506 illuminates the fingerprint sample 508 with a non-uniform pattern of illumination including one or more of (i) alternating light and dark lines, (ii) square spots of illumination, and (iii) illuminating only portions of the fingerprint sample for example only one edge of the fingerprint sample. The non-uniform pattern of illumination aids in determining the angular distribution emitted by the fingerprint sample 508.

Electronic device 502 includes at least one processor 552 communicatively coupled to display 502, optical fingerprint sensor 100/300, and memory 554 storing an application 556 (e.g., software/firmware) that include machine readable instructions that, when executed by processor 552, control display 502 and optical fingerprint sensor 100/300 to capture an image of a finger 508 touched to cover lens 504 proximate optical fingerprint sensor 100/300 to detect when fingerprint sample 508 is a spoof fingerprint.

Anti-Spoofing Using Polarization

Figure 6A:
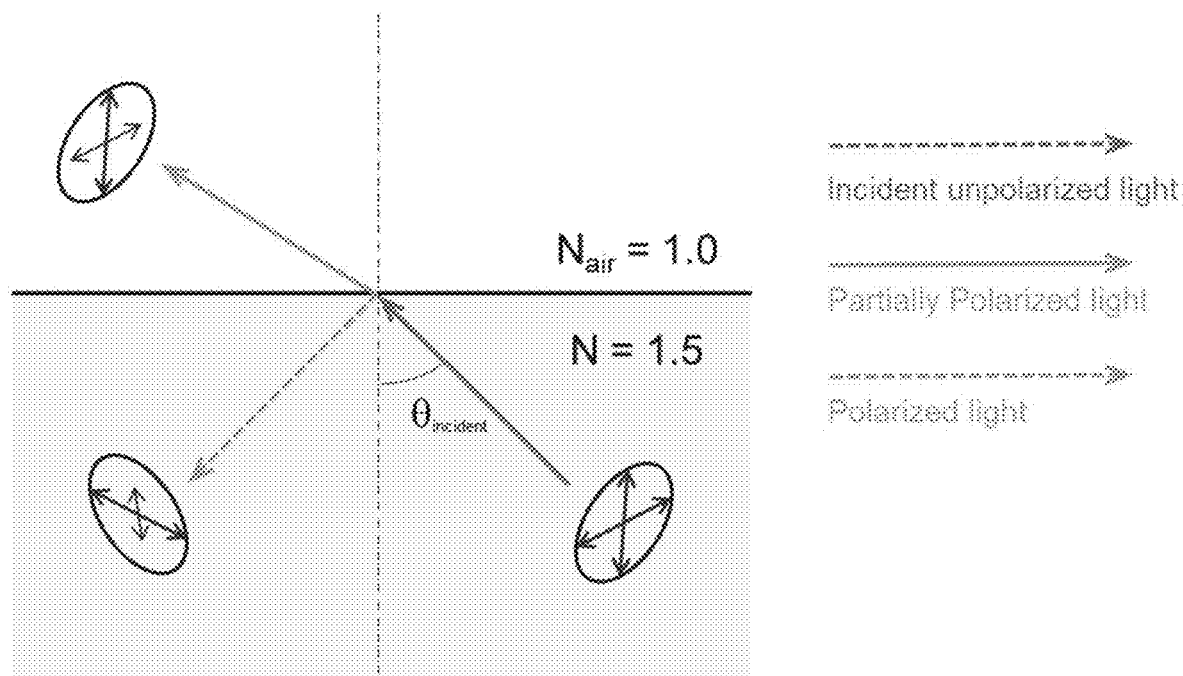
FIGS. 6A and 6B illustrate well-known Fresnel reflection equations.
Figure 6B:
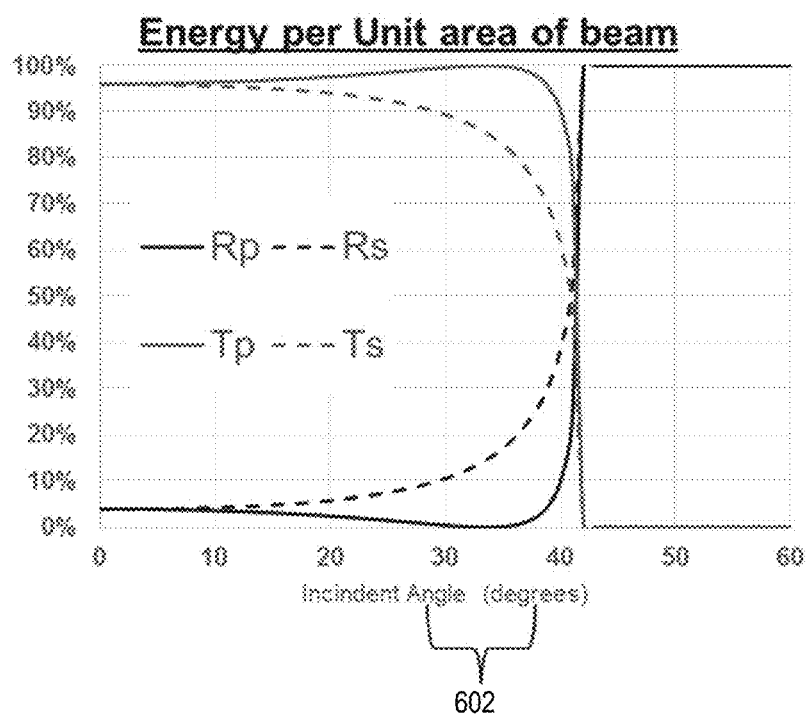

Fingerprint images have different levels of polarization depending on the optical geometry. One cause of polarization in the light that reaches the image sensor (e.g. 110) is reflection at larger angles of incidence. FIGS. 6A and 6B illustrate well-known Fresnel reflection that describe the effects of reflection at an interface. Particularly, the transverse-polarized (s-polarized) light has much higher reflection than parallel-polarized (p-polarized) light at larger angles (see 602 of FIG. 6B) and occurs at surfaces and regions where the reflection geometry is mostly planar (specular reflection) and not diffuse. Accordingly, the reflected light is highly polarized, while the transmitted (refracted) light is partially polarized.

Figure 7A:
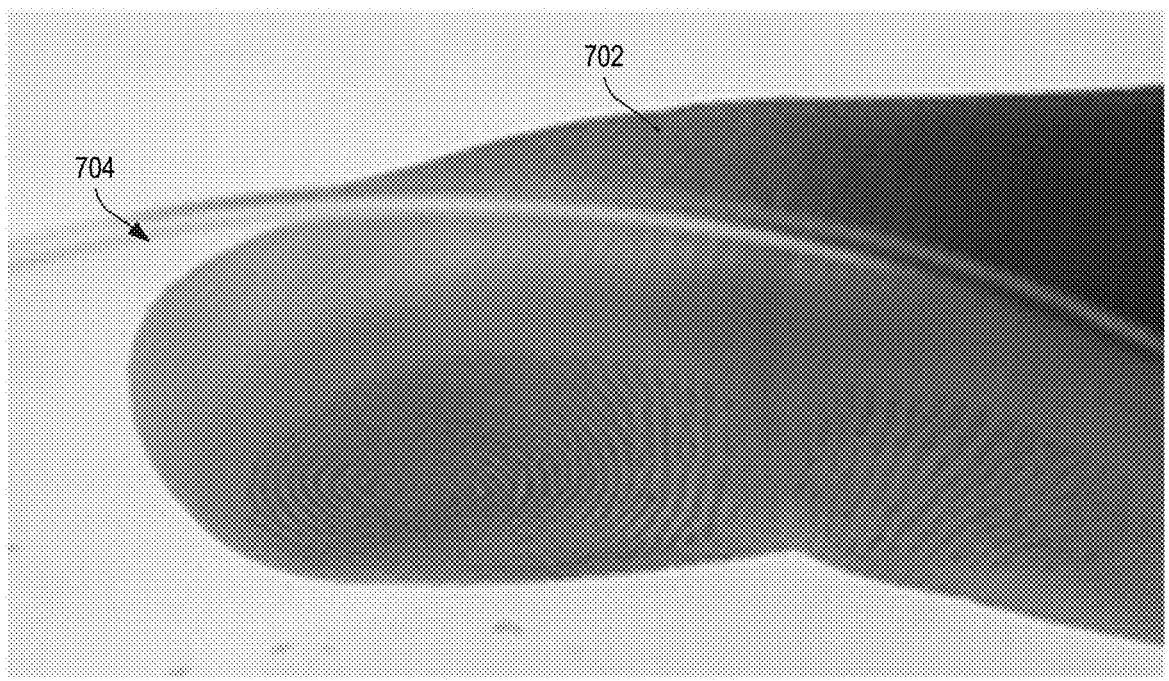
FIGS. 7A and 7B show a finger pressed against a surface of a glass substrate and illuminated from below by unpolarized light.
Figure 7B:
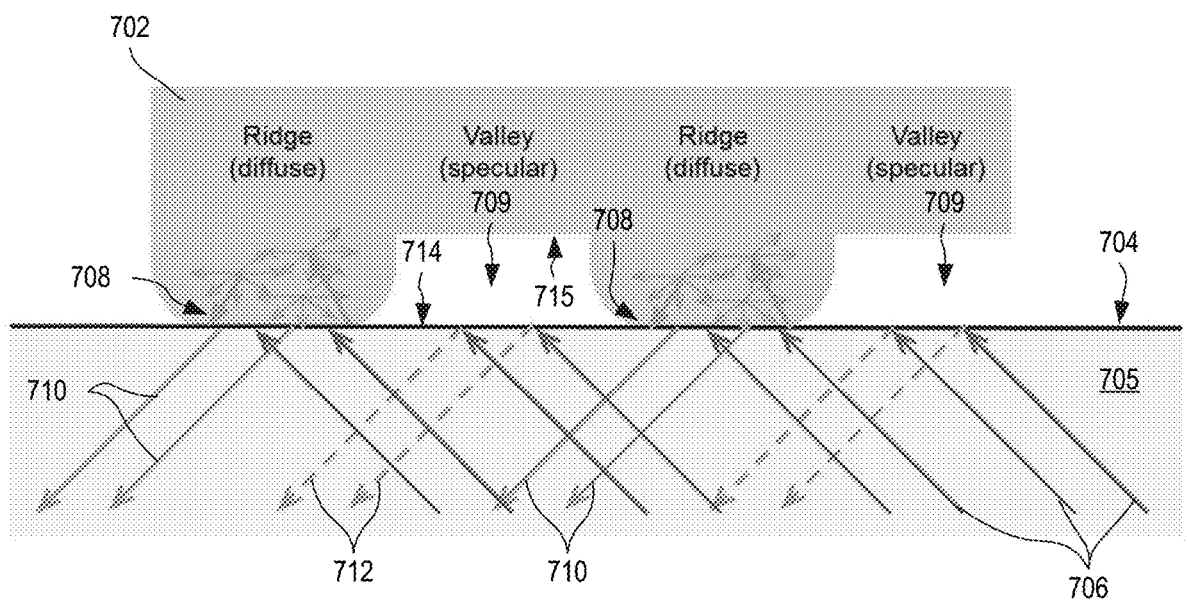

FIGS. 7A and 7B show a finger 702 pressed against a surface 704 of a substrate 705 (e.g., glass) and illuminated from below by unpolarized light 706, where Fresnel effects cause different polarization between ridge locations 708 and valley locations 709. The unpolarized light 706 is at a large angle of incidence. For ridge locations 708, where finger 702 makes contact with surface 704, most of the unpolarized light 706 is transmitted into the finger 702 and diffusely scattered, such that light 710, which leaves the finger 702 and travels back to the detector, remains unpolarized because the diffuse scattering prevents a primary orientation of polarization. However, at the valley locations 709, much of the unpolarized light 706 is specularly reflected as light 712. At valley locations 709, part of the unpolarized light 706 is reflected at the air/surface interface 714. However, even the portion of light that is transmitted across the air to the finger 702 at valley locations 709 has specular reflection at the air/finger interface 715. Under these specular conditions, the light reaching a detector (e.g., an image sensor similar to image sensor 310 of FIG. 3) is polarized, and the degree of polarization depends on the incident angle of unpolarized light 706 and may depend on other factors (e.g., wavelength, finger conditions, etc.).

Advantageously, differences in polarization relative to finger features (e.g., ridge location 708 and valley locations 709) allow detection of a fake finger presented at a fingerprint sensor as compared to a real finger. For example, a fake finger has a high degree of specular reflection, but has little diffuse scattering. By adapting an image sensor (e.g., one of image sensor 110 of FIGS. 1A and 1B and/or image sensor 310 of FIG. 3) to also detect and measure levels of polarization, these levels of polarization may be correlated with features captured in a fingerprint image simultaneously captured by the image sensor.

Figure 8:
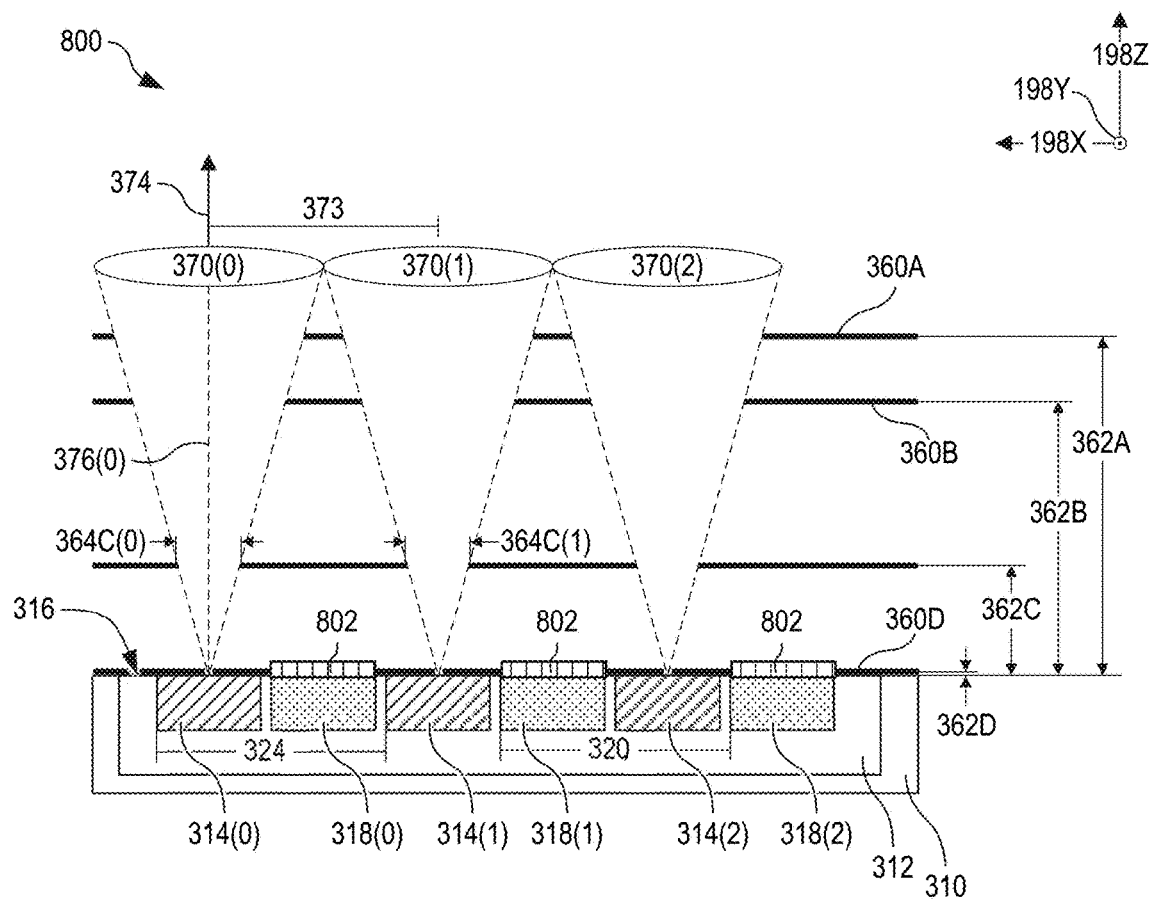
FIG. 8 illustrates a cross-sectional side view of an optical fingerprint sensor of FIG. 3 for detecting spoof fingerprints based on polarization, in an embodiment.

FIG. 8 illustrates a cross-sectional side view of an optical fingerprint sensor 800 for detecting spoof fingerprints based on polarization. Optical fingerprint sensor 800 is a further embodiment of optical fingerprint sensor 300 of FIG. 3 and description of like features is not repeated.

Optical fingerprint sensor 800 further includes a plurality of polarizing elements 802 positioned relative to second photodiodes 318 such that light entering first photodiodes 314 is unaffected. Accordingly, polarizing elements 802 may form an array positioned above pixel array 312. In certain embodiments, the array of polarizing elements 802 is formed as part of apertured baffle-layer 360D. As with optical fingerprint sensor 300, only second photodiodes 318 (e.g., also referred to as anti-spoof pixels) of optical fingerprint sensor 800 are used to detect polarization, and thus polarizing elements 802 are positioned only above second photodiodes 318. As known, a polarizing element (e.g., polarizing element 802) may reduce the intensity of unpolarized light by 50%. Thus, using a polarizing element that affects light entering first photodiodes 314 (e.g., primary sensing pixels) is unacceptable when optical fingerprint sensor 800 is used under-display, since light passing through the display is already reduced and a short integration time is required. Therefore, one advantage of optical fingerprint sensor 800 is that only second photodiodes 318 (e.g., anti-spoof pixels) are used to detect polarization, and not first photodiodes 314 (e.g., the image pixels).

Metal Grid Polarization

Figure 9:
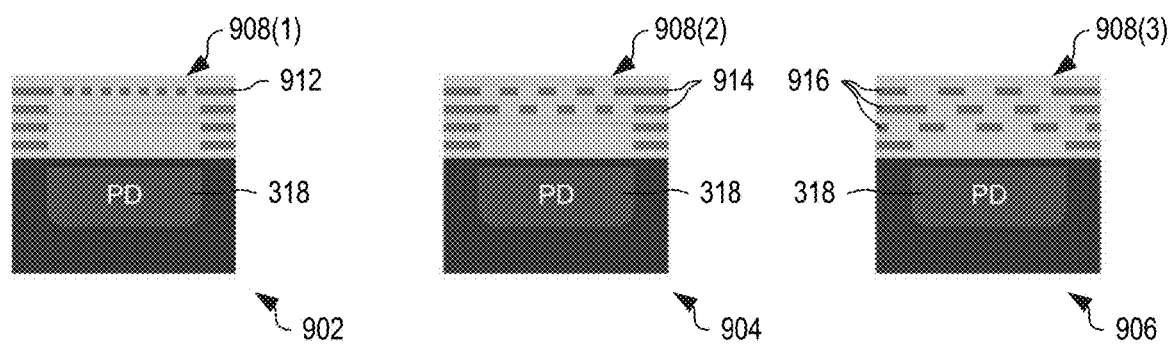
FIG. 9 shows three example CMOS pixels, each having one second photodiode, and one polarizing element implemented as a metal grid.

In one embodiment, polarizing element 802 is implemented as a wire grid. When light is passed through a grid of parallel conductors, light that is polarized parallel to the direction of the grid is reflected, and light with transverse polarization is transmitted. To achieve this effect in a CMOS pixel, one or more metal layers of the pixel may be patterned to form a polarizing element 802. FIG. 9 shows three example CMOS pixels 902, 904, and 906, each having one second photodiode 318, and one polarizing element 908 implemented as a metal grid. Polarizing element 908 may represent polarizing element 802 of FIG. 8. In CMOS pixel 902, polarization element 908(1) is implemented using a single metal layer 912, since the required line widths was achieved by fabrication. The linewidth being defined by the wavelength is the light being filtered. However, the required line widths may be difficult to achieve by some fabrication facilities. CMOS pixel 904 includes a polarizing element 908(2) implemented using two metal layers 914. CMOS pixel 906 includes a polarizing element 908(3) implemented using three metal layers 916. Accordingly, polarizing element 908 may be made of one or more metal layers. Using multiple metal layers may beneficially reduce fabrication requirements. More than three metal layers may be used without departing from the scope hereof.

Figure 10:
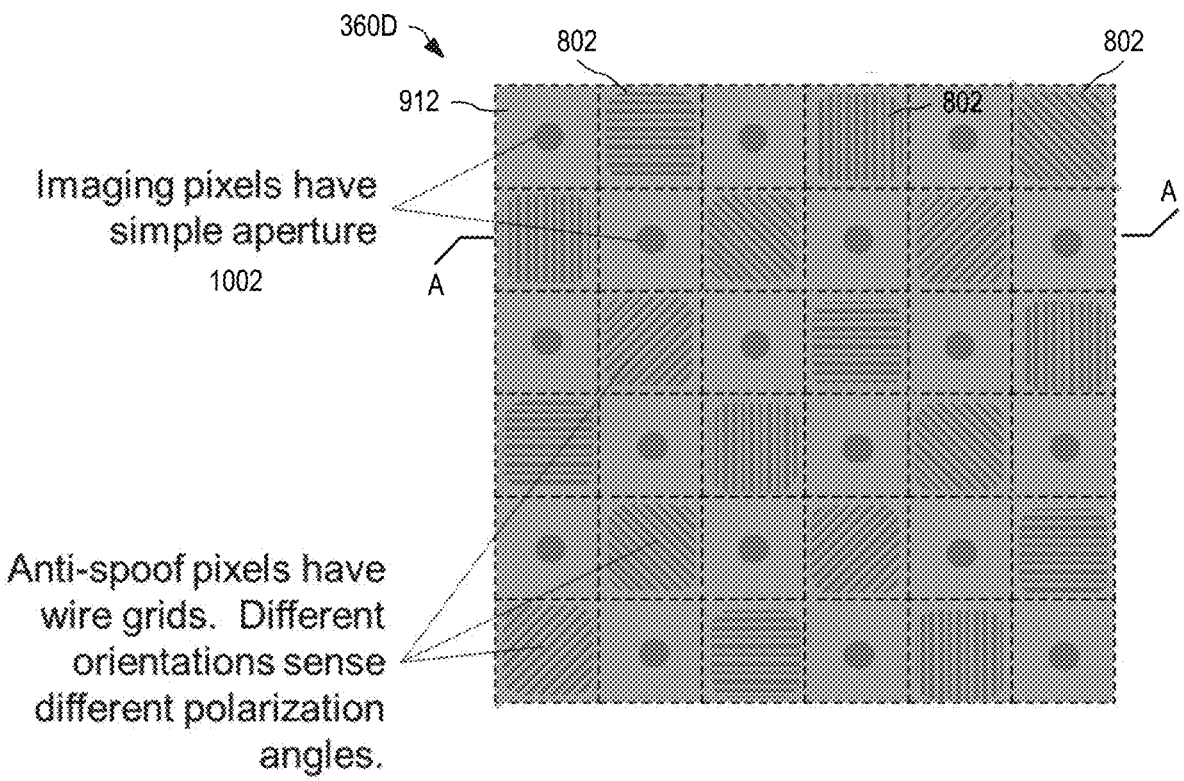
FIG. 10 is a plan elevation showing one example one metal layer within the optical fingerprint sensor of FIG. 8 implementing an array of polarizing elements, in embodiments.
Figure 11:
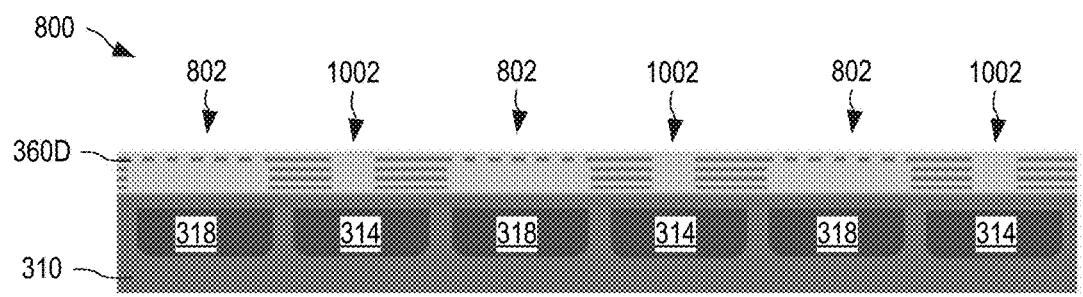
FIG. 11 is a cross section A-A illustrating the image sensor of FIG. 8 configured with the array of polarizing elements of FIG. 10, in embodiments.

FIG. 10 is a plan elevation showing one example metal layer apertured baffle-layer 360D of optical fingerprint sensor 800 of FIG. 8, implementing an array of polarizing elements 802. Apertured baffle-layer 360D forms the array such that each polarizing element 802 aligns with a different one of second photodiodes 318 of image sensor 310. Apertured baffle-layer 360D also forms a second array of simple apertures 1002 aligned such that each simple aperture 1002 aligns with a different one of first photodiodes 314 of image sensor 310. In the example of FIG. 10, different ones of the polarizing elements 802 have different orientations to cause the corresponding second photodiode 318 to detect light at the defined polarization angle. FIG. 11 is a cross section A-A illustrating image sensor 310 configured with apertures baffle-layer 360D, where each polarization element 802 is positioned above a different second photodiode 318, and simple apertures 1002 are positioned above a different first photodiode 314.

Multilayer Film Polarization

Figure 12:
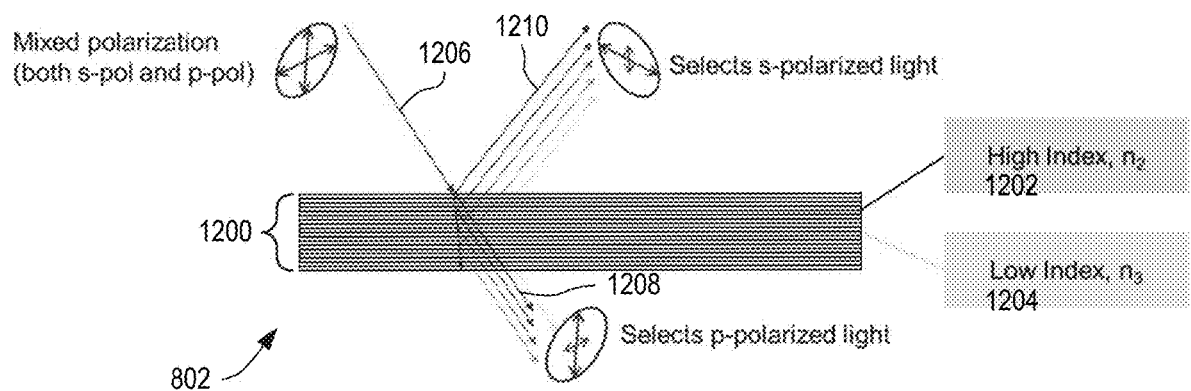
FIG. 12 is a schematic illustrating polarizing element 802 implemented as a multilayer film 1200 (e.g., multi-coating) that discriminates between polarized and unpolarized light, in embodiments.

FIG. 12 is a schematic illustrating polarizing element 802 implemented as a multilayer film 1200 (e.g., multi-coating) that discriminates between polarized and unpolarized light. Multilayer film 1200 is fabricated as a plurality of alternating layers 1202, 1204, where layer 1202 has a different index from layer 1204. The plurality of alternating layers 1202, 1204, are stack on top of each other and amplify the Fresnel effect so that light 1206 incident at larger angles of incident is primarily transmitted as p-polarized light 1208, and s-polarized light 1210 is reflected. In one embodiment, polarizing element 802 is formed of two different types of layer 1202 and 1204 that are alternately added, where layer 1202 has a high index and layer 1204 has low index. In certain embodiments, polarization element 802 may be implemented similar to a spectral filter. In other embodiments, polarizing element 802 may be an IR cut filter, similar to those used in optical fingerprint sensors.

Figure 13:
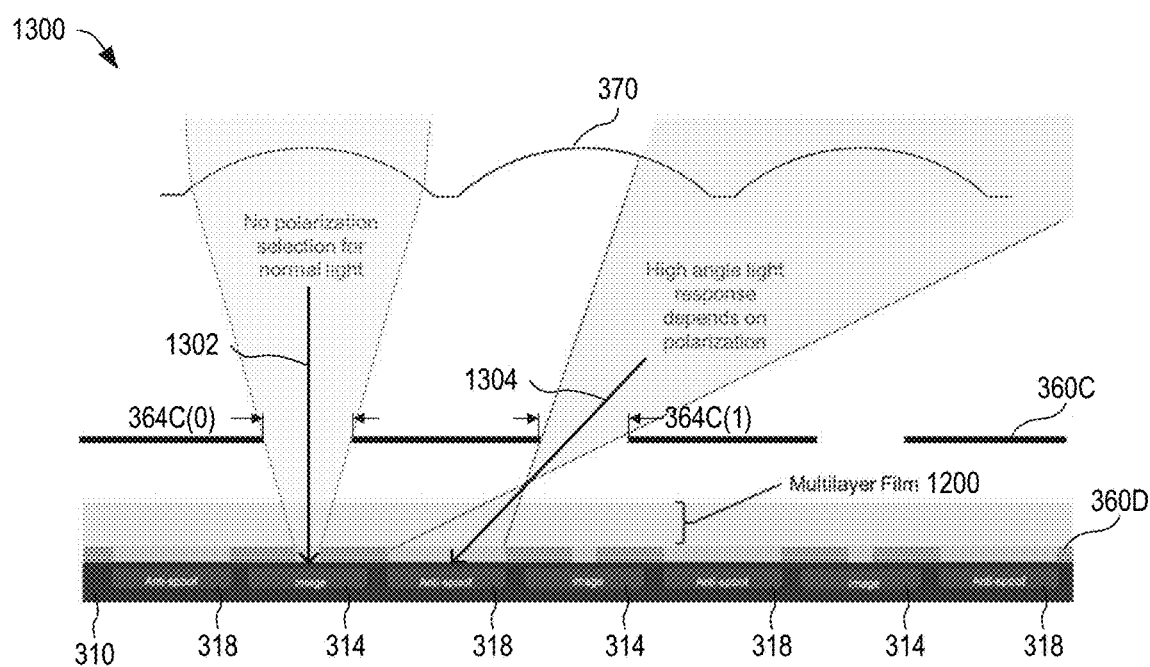
FIG. 13 is a schematic illustrating one example optical fingerprint sensor using the multilayer film of FIG. 12, in embodiments.

FIG. 13 is a schematic illustrating one example optical fingerprint sensor 1300 using multilayer film 1200 of FIG. 12, where multilayer film 1200 is distributed across image sensor 310 (e.g., on top of apertured baffle-layer 360D). Optical fingerprint sensor 1300 is similar to optical fingerprint sensor 800 of FIG. 8, but the array of polarizing elements 802 is replaced by multilayer film 1200. Not all components of optical fingerprint sensor 1300 are shown for clarity of illustration.

In combination with the apertures (e.g., apertures of apertured baffle-layer 360) that limit the angle of light 1302 incident on first photodiodes 314, multilayer film 1200 acts as a polarizer for second photodiodes 318 (e.g., anti-spoof pixels) since incident light 1304 on second photodiodes 318 occurs only at larger angles, but multilayer film 1200 does not cause polarization of light 1302 incident on first photodiodes 314 (e.g., imaging pixels), since light 1302 is at near-normal angles.

Figure 14:
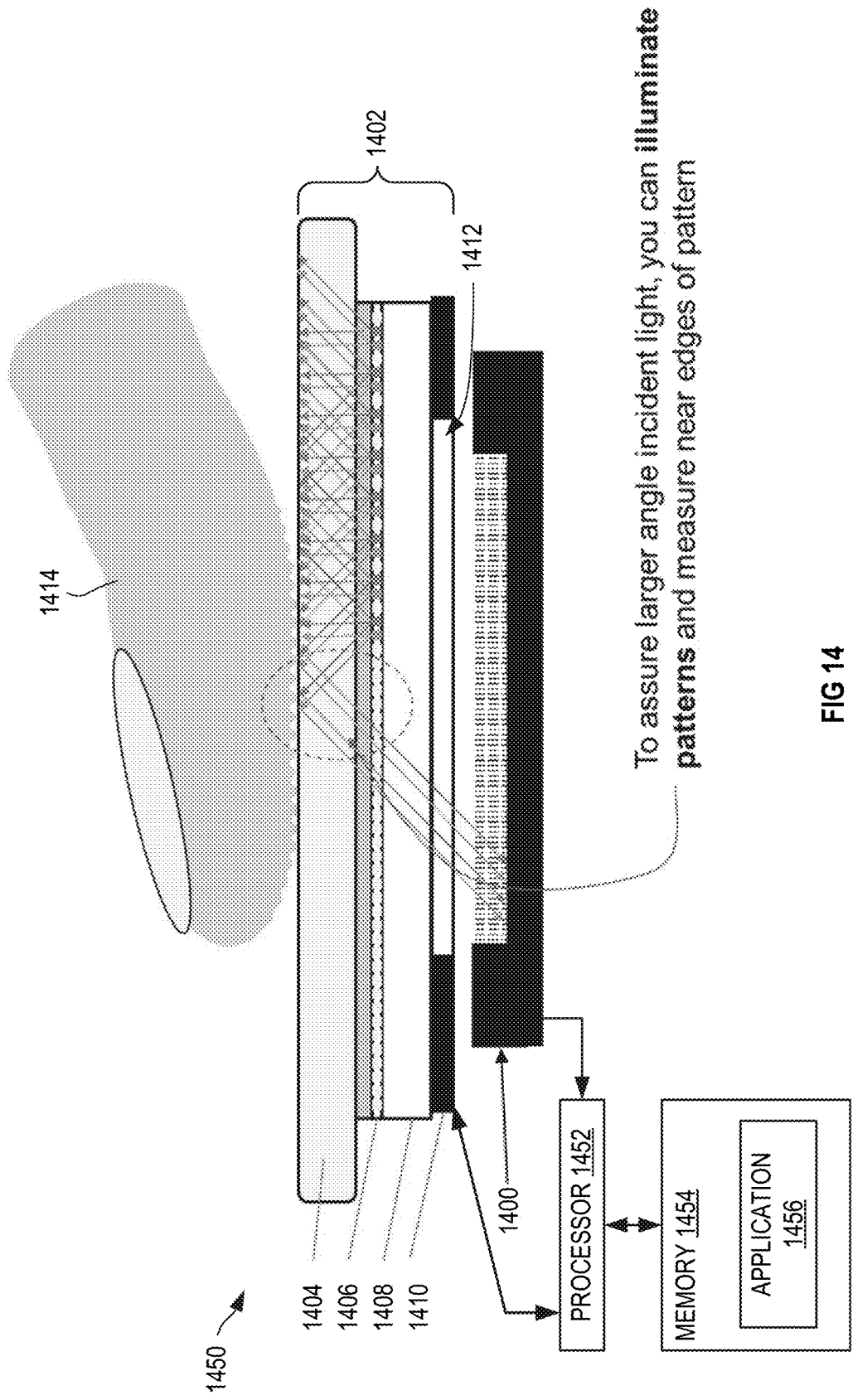
FIG. 14 is a functional diagram illustrating one example under-display application of an optical fingerprint sensor of FIG. 8, in embodiments.

FIG. 14 is a functional diagram illustrating one example under-display application of an optical fingerprint sensor 1400. Optical fingerprint sensor 1400 may represent any of optical fingerprint sensor 100 of FIG. 1, optical fingerprint sensor 300 of FIG. 3, optical fingerprint sensor 800 of FIG. 8 and FIG. 11, and optical fingerprint sensor 1300 of FIG. 13. Optical fingerprint sensor 1400 is positioned beneath a display 1402 of an electronic device 1450 (e.g., a smartphone, a tablet computer, a notebook computer, etc.), and may be used to biometrically authenticate a user of electronic device 1450. Display 1402 may include a cover lens 1404, a light emitting layer 1406 (e.g., an OLED layer), a substrate 1408, and a black backing 1410. Black backing 1410 may include an aperture 1412 aligned with optical fingerprint sensor 1400 to allow light to reach optical fingerprint sensor 1400. Light incident on optical fingerprint sensor 1400 from display 1402 (e.g., incident light) has a broad angular distribution. For example, display 1402 may be controlled to emit light beneath finger 1414 such that reflected and refracted light from finger 1414 is sensed by optical fingerprint sensor 1400.

Electronic device 1450 includes at least one processor 1452 communicatively coupled display 1402, optical fingerprint sensor 1400, and memory 1454 storing an application 1456 (e.g., software/firmware) that include machine readable instructions that, when executed by processor 1452, control display 1402 and optical fingerprint sensor 1400 to capture an image of a finger 1414 touched to cover lens 1404 proximate optical fingerprint sensor 1400 to detect when finger 1414 is fake.

In one example of operation, application 1456 controls display 1402 to output a pattern of light at certain wavelengths (e.g., colors) and at certain locations relative to optical fingerprint sensor 1400 such that the incident light reaching optical fingerprint sensor 1400 is confined to larger angle of incidence on the optical fingerprint sensor 1400. For example, application 1456 may generate a pattern on display 1402 to form an edge of illumination on finger 1414. For second photodiodes 318 (e.g., the anti-spoof pixels) near but outside the area illuminated by the pattern on display 1402, incident light is incident with larger angels of incidence. In certain embodiments, application 1456 may control display 1402 to output a sequence of patterns, capturing, for each pattern, a fingerprint image using first photodiodes 314 and polarization measurements using second photodiodes 318. For example, the sequence of patterns may effectively move the light source relative to finger 1414 such that different ones of second photodiodes 318 capture larger-angle incident light from different areas of finger 1414.

Application 1456 may include artificial intelligence (AI) including machine learning algorithms, that correlate at least two of the generated illumination patterns, the captured fingerprint image, and the locations of second photodiodes 318 (e.g., anti-spoof pixels). Application 1456 may then detect a variety of possible relationships and correlations between finger features, illumination, polarization, illumination location, and second photodiode 318 location, that enables spoof detection, such as detection whether finger 1414 is real or not.

Figure 15:
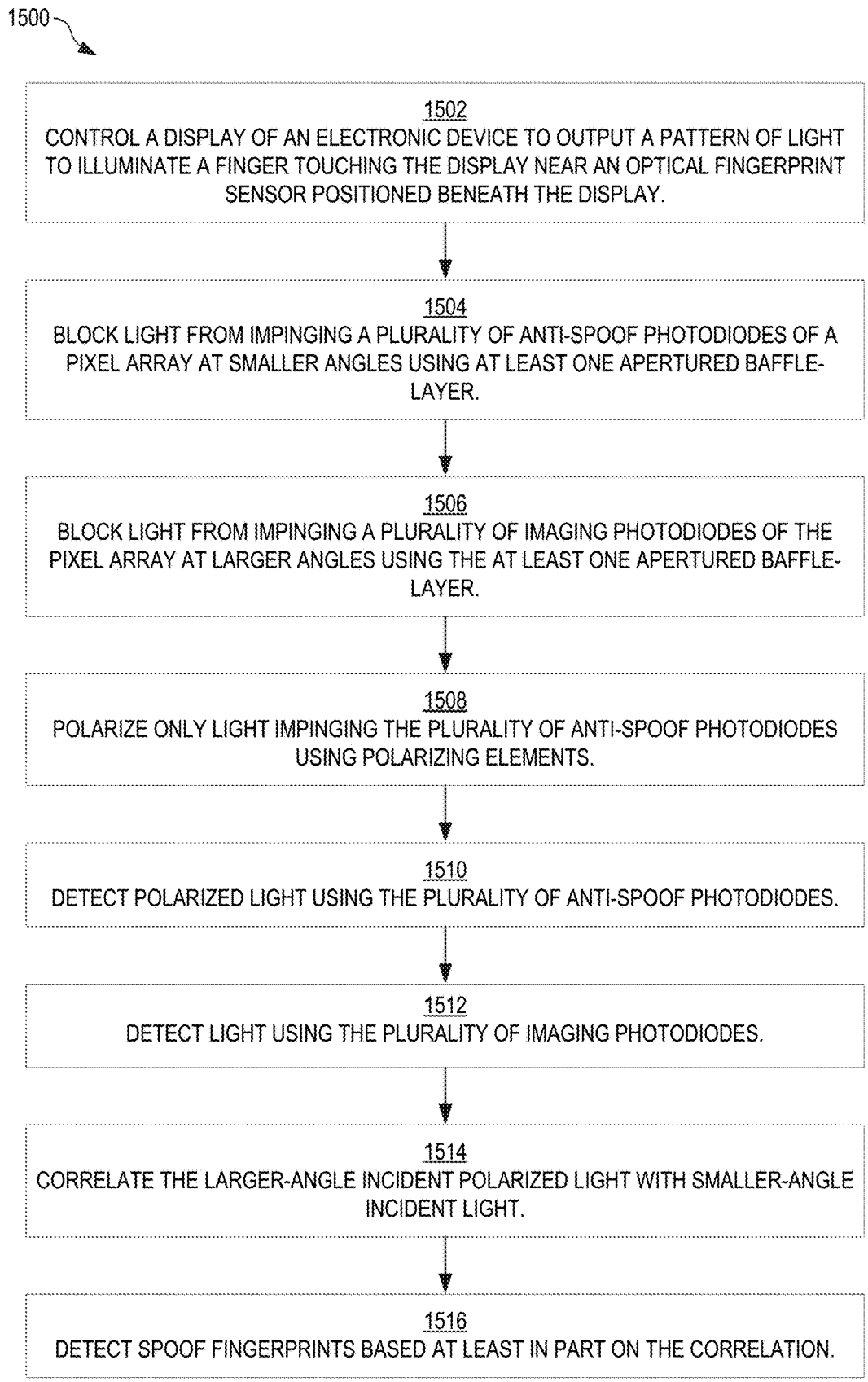
FIG. 15 is a flowchart illustrating one example method for optical fingerprint sensor spoof detection using polarization, in embodiments.

FIG. 15 is a flowchart illustrating one example method 1500 for optical fingerprint sensor spoof detection using polarization. Method 1500 may be implement by optical fingerprint sensor 1400 and at least in part by application 1456. For example, blocks 1502, 1514, and 1516 may be implemented by application 1456, and blocks 1504 through 1512 may be implemented by optical fingerprint sensor 1400. Method 1500 includes blocks 1502, 1504, 1506, 1508, 1510, 1512, 1514, and 1516.

In block 1502, method 1500 controls a display of an electronic device to output a pattern of light to illuminate a finger touching the display near an optical fingerprint sensor positioned beneath the display. In one example of block 1502, application 1456 controls display 1402 to output a pattern to illuminate finger 1414 touching display 1402 near optical fingerprint sensor 1400 positioned beneath the display 1402. In block 1504, method 1500 blocks light from impinging a plurality of anti-spoof photodiodes of a pixel array at smaller angles using at least one apertured baffle-layer. In one example of block 1504, apertured baffle-layer 360 blocks light from impinging second photodiodes 318 of pixel array 312.

In block 1506, method 1500 blocks light from impinging a plurality of imaging photodiodes at larger incident angles using the at least one apertured baffle-layer. In one example of block 1506, apertured baffle-layer 360 blocks light from impinging first photodiodes 314 of pixel array 312 at larger angles. In block 1508, method 1500 detects the polarization of light impinging the plurality of anti-spoof photodiodes using polarizing elements. In one example of block 1508, wire grid polarizing elements 802 positioned only proximate second photodiodes 318 polarize light impinging only second photodiodes 318. In another example of block 1508, multilayer film 1200 only polarized higher-angle incident light impinging second photodiodes 318 and does not polarize smaller-angle incident light impinging first photodiodes 314. In block 1510, method 1500 detects polarized light using the plurality of anti-spoof photodiodes. In one example of block 1510, second photodiodes 318 detect light polarized by polarizing elements 802. In block 1512, method 1500 detects light using the plurality of imaging photodiodes. In one example of block 1512, first photodiodes 314 detect light from finger 1414.

In block 1514, method 1500 correlates the larger-angle incident polarized light with the smaller-angle incident light. In one example of block 1514, application 1456 correlates larger-angle incident polarized light detected by second photodiodes 318 with smaller-angle incident light detected by first photodiodes 314. In block 1516, method 1500 detects spoof fingerprints based at least in part on the correlation. In one example of block 1516, application 1456 implements one or more machine learning algorithms to determine whether finger 1414 is real or spoofed.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features (A1) In a first aspect, a method for detecting spoof fingerprints detected using an optical fingerprint sensor and polarization, includes controlling a display of an electronic device to output a pattern of light to illuminate a fingerprint sample touching the display near an optical fingerprint sensor including a pixel array and positioned beneath the display; blocking smaller-angle light from impinging a plurality of anti-spoof photodiodes of the pixel array, the smaller-angle light being electromagnetic energy with incident angle less than five degrees from an optical axis of each anti-spoof photodiode of the plurality of anti-spoof photodiode; filtering larger-angle light incident on the plurality of anti-spoof photodiodes to at least one polarization direction, the larger-angle light being electromagnetic energy with incident angle greater than five degrees from the optical axis; detecting the larger-angle light at the at least one polarization direction using the plurality of anti-spoof photodiodes; correlating the larger-angle light at the at least one polarization direction with the pattern of light; determining the fingerprint spoofing based at least in part on the correlation of the larger-angle light at the at least one polarization direction and the pattern of light; and wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

(AB2) In an embodiment of (A1), wherein the pattern of light forms an edge of illumination on the finger.

(A3) In an embodiment of either (A1) or (A2), the step of controlling includes controlling the display to output a sequence of patterns of light to illuminate the finger, the step of detecting the larger-angle light includes detecting the larger-angle light for each pattern in the sequence of patterns, the step of correlating includes correlating the larger-angle light with each pattern.

(A4) In an embodiment of any of (A1) through (A3), the step of filtering includes filtering larger-angle light incident on a first group of the plurality of anti-spoof photodiodes at a first polarization direction and filtering larger-angle light incident on a second group of the plurality of anti-spoof photodiodes at a second polarization direction different from the first polarization direction, the step of detecting the larger-angle light includes detecting the larger-angle light at the first polarization direction using the first group of the plurality of anti-spoof photodiodes and detecting the larger-angle light at the second polarization direction using the second group of the plurality of anti-spoof photodiodes, the step of correlating includes correlating the larger-angle light at the first polarization direction and the larger-angle light at the second polarization direction with each pattern in the sequence of patterns.

(A5) In an embodiment of any of (A1) through (A4), the step of detecting further includes using machine learning algorithm to learn correlations between the larger-angle light at the at least one polarization direction with the smaller-angle light and the pattern of light for real and spoof fingerprints.

(A6) In an embodiment of any of (A1) through (A5), further includes blocking larger-angle light from impinging a plurality of image photodiodes of the pixel array; and detecting smaller-angle light impinging the plurality of image photodiodes.

(A7) In an embodiment of any of (A1) through (A6), further includes directing smaller-angle light with a plurality of lenses, each lens directing smaller-angle light toward one imaging photodiode of the plurality of imaging photodiodes.

(A8) In an embodiment of any of (A1) through (A7), the step of filtering includes filtering larger-angle light incident on a first group of the plurality of anti-spoof photodiodes at a first polarization direction and filtering larger-angle light incident on a second group of the plurality of anti-spoof photodiodes at a second polarization direction different from the first polarization direction, the step of detecting the larger-angle light includes detecting the larger-angle light at the first polarization direction using the first group of the plurality of anti-spoof photodiodes and detecting the larger-angle light at the second polarization direction using the second group of the plurality of anti-spoof photodiodes, the step of correlating includes correlating the larger-angle light at the first polarization direction and the larger-angle light at the second polarization direction with the pattern of light.

(B1) In a second aspect, a method for detecting spoof fingerprints detected using an optical fingerprint sensor positioned beneath a display of an electronic device comprising a pixel array of a plurality of imaging photodiodes and a plurality of anti-spoof photodiodes, includes controlling the display to output a pattern of light to illuminate a fingerprint sample touching the display near the optical fingerprint sensor; blocking light from impinging the plurality of anti-spoof photodiodes of the pixel array at smaller angles; blocking light from impinging the plurality of imaging photodiodes at larger angles; polarizing light incident on the plurality of anti-spoof photodiodes to at least one polarization direction; detecting the light at the at least one polarization direction using the plurality of anti-spoof photodiodes; detecting light using the plurality of imaging photodiodes; correlating the light at the at least one polarization direction with one of the pattern of light and the light detected using the plurality of imaging photodiodes; determining the fingerprint spoofing based at least in part on the correlation of the light at the at least one polarization direction and one of the pattern of light and the light detected using the plurality of imaging photodiodes; wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

What is claimed is:

1. A method for detecting spoof fingerprints detected using an optical fingerprint sensor and polarization, comprising:
    controlling a display of an electronic device to output a pattern of light to illuminate a fingerprint sample touching the display near an optical fingerprint sensor including a pixel array and positioned beneath the display;
    blocking smaller-angle light from impinging a plurality of anti-spoof photodiodes of the pixel array, the smaller-angle light being electromagnetic energy with incident angle less than five degrees from an optical axis of each anti-spoof photodiode of the plurality of anti-spoof photodiode;
    filtering larger-angle light incident on the plurality of anti-spoof photodiodes to at least one polarization direction, the larger-angle light being electromagnetic energy with incident angle greater than five degrees from the optical axis;
    detecting the larger-angle light at the at least one polarization direction using the plurality of anti-spoof photodiodes;
    correlating the larger-angle light at the at least one polarization direction with the pattern of light;
    determining the fingerprint spoofing based at least in part on the correlation of the larger-angle light at the at least one polarization direction and the pattern of light; and wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

2. The method of claim 1, wherein the pattern of light forms an edge of illumination on the finger.

3. The method of claim 1, the step of controlling comprising controlling the display to output a sequence of patterns of light to illuminate the finger, the step of detecting the larger-angle light comprising detecting the larger-angle light for each pattern in the sequence of patterns, the step of correlating comprising correlating the larger-angle light with each pattern.

4. The method of claim 1, the step of filtering comprising filtering larger-angle light incident on a first group of the plurality of anti-spoof photodiodes at a first polarization direction and filtering larger-angle light incident on a second group of the plurality of anti-spoof photodiodes at a second polarization direction different from the first polarization direction, the step of detecting the larger-angle light comprising detecting the larger-angle light at the first polarization direction using the first group of the plurality of anti-spoof photodiodes and detecting the larger-angle light at the second polarization direction using the second group of the plurality of anti-spoof photodiodes, the step of correlating comprising correlating the larger-angle light at the first polarization direction and the larger-angle light at the second polarization direction with each pattern in the sequence of patterns.

5. The method of claim 1, the step of detecting further comprising using machine learning algorithm to learn correlations between the larger-angle light at the at least one polarization direction with the smaller-angle light and the pattern of light for real and spoof fingerprints.

6. The method of claim 1, further comprising:
blocking larger-angle light from impinging a plurality of image photodiodes of the pixel array; and
detecting smaller-angle light impinging the plurality of image photodiodes.

7. The method of claim 6, further comprising directing smaller-angle light with a plurality of lenses, each lens directing smaller-angle light toward one imaging photodiode of the plurality of imaging photodiodes.

8. The method of claim 1, the step of filtering comprising filtering larger-angle light incident on a first group of the plurality of anti-spoof photodiodes at a first polarization direction and filtering larger-angle light incident on a second group of the plurality of anti-spoof photodiodes at a second polarization direction different from the first polarization direction, the step of detecting the larger-angle light comprising detecting the larger-angle light at the first polarization direction using the first group of the plurality of anti-spoof photodiodes and detecting the larger-angle light at the second polarization direction using the second group of the plurality of anti-spoof photodiodes, the step of correlating comprising correlating the larger-angle light at the first polarization direction and the larger-angle light at the second polarization direction with the pattern of light.

9. A method for detecting spoof fingerprints detected using an optical fingerprint sensor positioned beneath a display of an electronic device comprising a pixel array of a plurality of imaging photodiodes and a plurality of anti-spoof photodiodes, comprising:

controlling the display to output a pattern of light to illuminate a fingerprint sample touching the display near the optical fingerprint sensor;

blocking light from impinging the plurality of anti-spoof photodiodes of the pixel array at smaller angles;

blocking light from impinging the plurality of imaging photodiodes at larger angles;

polarizing light incident on the plurality of anti-spoof photodiodes to at least one polarization direction;

detecting the light at the at least one polarization direction using the plurality of anti-spoof photodiodes;

detecting light using the plurality of imaging photodiodes;

correlating the light at the at least one polarization direction with one of the pattern of light and the light detected using the plurality of imaging photodiodes; and determining the fingerprint spoofing based at least in part on the correlation of the light at the at least one polarization direction and one of the pattern of light and the light detected using the plurality of imaging photodiodes;

wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes.

* * * * *